United States Patent [19]

Wise

[11] Patent Number: 4,864,875

[45] Date of Patent: Sep. 12, 1989

[54] DIGITAL ELECTRONIC CALIBRATOR FOR TENNIS RACKET STRINGING MACHINES

[75] Inventor: Herbert H. Wise, New York, N.Y.

[73] Assignee: Wise USA, Incorporated, New York, N.Y.

[21] Appl. No.: 212,960

[22] Filed: Jun. 29, 1988

[51] Int. Cl.$^4$ ................................................ G01L 5/10
[52] U.S. Cl. ................................ 73/862.43; 73/862.48; 73/828; 273/73 A
[58] Field of Search ................ 73/1 B, 862.43, 862.48, 73/828; 364/508, 571.01; 273/73 A

[56] References Cited

U.S. PATENT DOCUMENTS 3,964,291  6/1976  Ogden ................................... 73/1 B
4,590,808  5/1986  Lightfoot et al. ................. 73/818 X

FOREIGN PATENT DOCUMENTS 3515630  11/1986  Fed. Rep. of Germany ... 273/73 A
491850   11/1975  U.S.S.R. .......................... 73/862.48

*Primary Examiner*—Tom Noland
*Attorney, Agent, or Firm*—Toren, McGeady & Associates

[57] ABSTRACT

A device for checking the calibration of tennis racket stringing machines, having an input rod to which a non-stretch cable is attached for attaching to the tension head of a stringing machine, a force lever system attached to the input rod for receiving the tension exerted on the rod, a strain transducer attached to the force lever system for converting the stresses in the lever system to electrical energy, and a microprocessor for receiving the output of the transducer and converting the same to an identifiable tension value.

6 Claims, 2 Drawing Sheets

DIGITAL ELECTRONIC CALIBRATOR FOR TENNIS RACKET STRINGING MACHINES

BACKGROUND OF THE INVENTION

1. Field of the Invention

The subject invention relates to an apparatus for calibrating the tension exerted on the strings of tennis rackets by stringing machines, and, in particular, an apparatus which accurately and reliably indicates the amount of tension which is exerted by the stringing machines.

2. Description of Related Art

For years tennis rackets were made of wood laminates. Today, wood rackets have, for the most part, been replaced by molded plastic frames.

Parallel with the development of these plastic frames comes a new sophistication in the manufacture of synthetic strings. The early mono-filament string, fashioned on a single strand of extruded nylon, is used only in the least expensive rackets. New technology has produced multifiber strings, both coreless and cored, that, in conjunction with the new rackets, offer a feel closely related to that of "gut". Most touring professional players still use gut strings. Gut, made from animal intestines, while being more expensive and less durable, offers more sensitivity, power and control to the player. Manufacturers try to emulate these qualities with their plastic strings while retaining the inherent advantages of synthetics, namely durability. It should be noted that 85% of the amateur players in the U.S. use synthetic strings.

Today, more so than ever, the combination of correct stringing tension and racket frame are critical to the playability of a racket. Manufacturers suggest a range of stringing tension for each racket they produce. Tighter stringing produces less power while giving greater control. Conversely, looser stringing produces more power and feel while exhibiting less control. In calculating the string tension best suited for ones own game, the player must consider the racket, power-play vs. control, court surface, etc.

Stringing a tennis racket involves bracing the racket in a frame holder to prevent the racket from distorting when it is subjected to extreme tensions. The string is woven into the racket using pre-formed holes along the side of the frame. The pattern of weaving is suggested by the racket manufacturer considering, among other things, how best to apply pressure to the strings without damaging or distorting the racket. In general, the end of the string is tied to the racket and the loose end is threaded through an appropriate opposing hole and then placed in a tension head, a vice-like device which pulls the string, either manually, electrically or pneumatically, to a predetermined tension. The string is then "clamped off" to maintain the tension and the loose end is woven further into the racket, again placed into the tension head where the same predetermined tension is applied to the length of string up to the clamp. The string is again clamped off and the process is repeated until all of the main strings and the cross strings are taut.

It should be apparent that there is a need for accuracy in setting the tension head prior to stringing; else the delicate combination of racket, string, player preference would be severely compromised. Before stringing, the tension head is set to the tension chosen by the player.

While there exists devices for checking the tension on tennis racket stringing machines, for example the EAG-NAS TCG-100, these devices ordinarily consist of a tension spring with a marker attached thereto which indicates the applied tension on a scale inscribed on the housing. While the accuracy of these devices are sufficient for calibrating machines used for stringing rackets for beginners and some intermediate amateur players, with respect to upper intermediate and advanced amateur and professional players, the attainable accuracy with these devices is sorely lacking. It should be noted that a professional player can easily notice the inconsistency of one pound of tension!

SUMMARY OF THE INVENTION

An object of the present invention is to provide a device for checking the calibration of tennis racket stringing machines which is capable of providing the accuracy necessary for satisfying the needs of all levels of players.

It is a further object of the present invention to provide a device for checking the calibration of tennis racket stringing machines which is capable of providing a directly readable indication of the applied tension.

The above objects are achieved in a device for checking the calibration of tennis racket stringing machines, having an input rod to which a non-stretch cable is attached for attaching to the tension head of a stringing machine, a force lever system attached to the input rod for receiving the tension exerted on the rod, a strain transducer attached to the force lever system for converting the stresses in the lever system to electrical energy, and a microprocessor for receiving the output of the transducer and converting the same to an identifiable tension value. The means for reading the tension value may be in the form of "go/no-go" LEDs in which the device is dedicated to various specific values. Alternatively, the output of the microprocessor may be directed to a driver which, in turn, drives an LED or liquid crystal display.

BRIEF DESCRIPTION OF THE DRAWINGS

With the above and additioal objects and advantages in mind as will hereinafter appear, the subject invention will be described with reference to the accompanying drawings, in which.

DESCRIPTION OF THE PREFERRED EMBODIMENT

Figure 1:
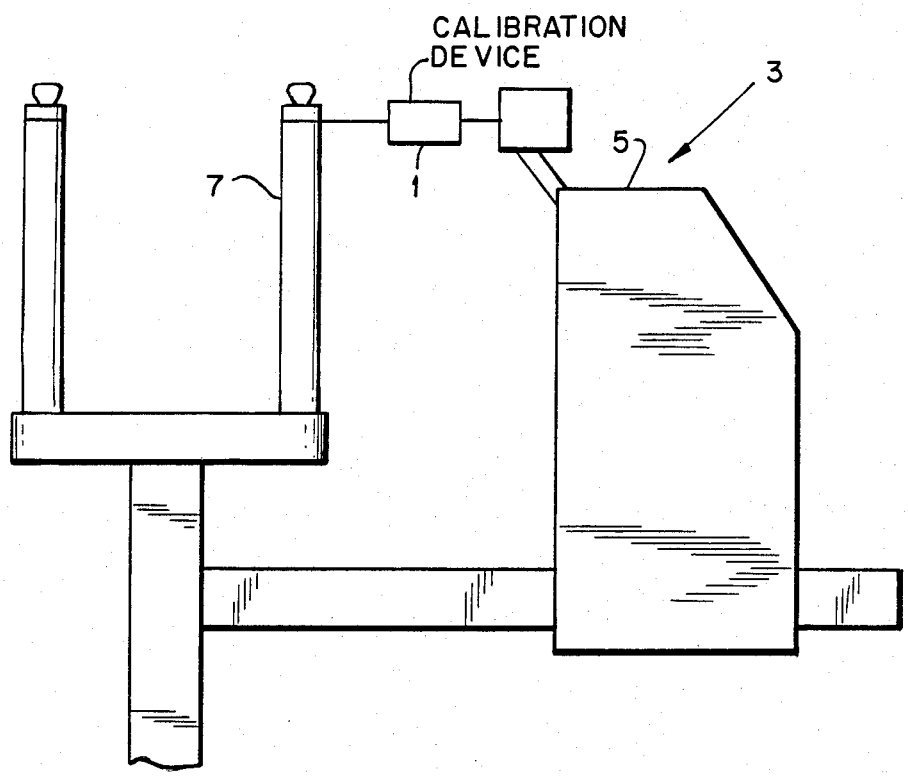
FIG. 1 shows the device of the subject invention in use in a typical tennis racket stringing machine.

Referring to FIG. 1, the calibration device 1 is shown mounted in a tennis racket stringing machine 3. The machine 3 includes a tension head 5 and a structure 7 for securing a tennis racket frame, which is used to secure the device 1.

Figure 2:
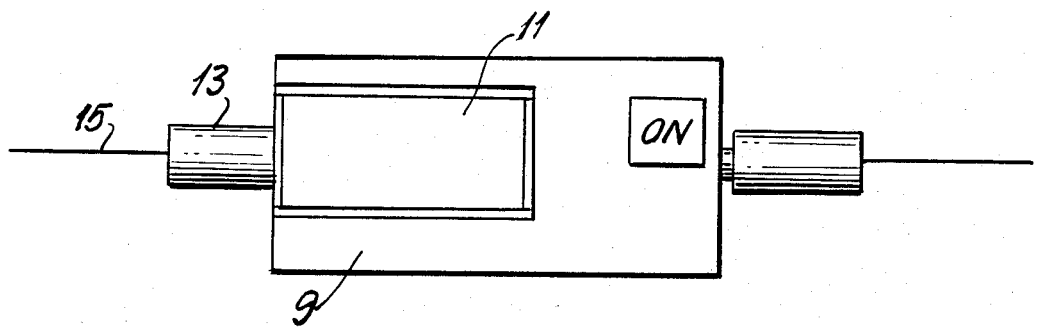
FIG. 2 is a plan view of the device of the subject invention.

As shown in FIG. 2, the device 1 includes a case 9 having a display 11 mounted therein. The device 1 further includes an input rod 13 to which is attached a non-stretch cable 15, made of, for example, steel, for connection to the tension head 5.

Figure 3:
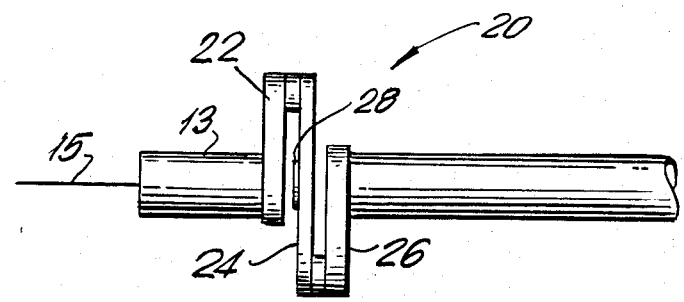
FIG. 3 is a functional diagram of the force lever system used in the subject invention.

The input rod 13 is attached, as shown in FIG. 3, to a force lever system 20, including a first transverse member 22 to which the input rod 13 is rigidly affixed at one end thereof. The first transverse member 22 has a substantial cross-sectional width and is thus able to transmit the total amount of the stress exerted thereon by the input rod 13 to a second transverse member 24, which has a substantially smaller cross-sectional width than the first transverse member 22 and is attached to an opposite end of the first transverse member 22. A third transverse member 26 is attached to the second transverse member 24 at an end thereof remote from the first transverse member 22, and at an opposite end is rigidly attached to the case 9. Finally, the second transverse member 24 has rigidly attached thereto, substantially at a midpoint thereof, a strain transducer 28 for sensing any stresses in the second transverse member 24, existing therein due to tensions exerted on the input rod 13, and converting these sensed stresses into electrical signals.

Figure 4:
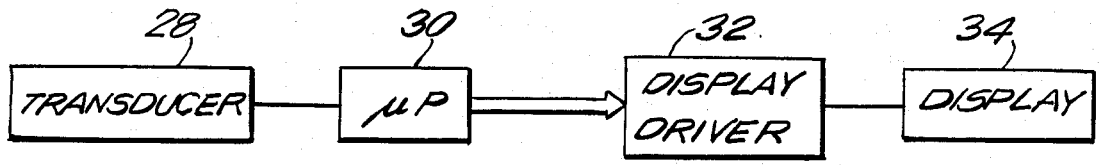
FIG. 4 is a schematic block diagram of the device.

FIG. 4 shows a block diagram in which the electrical signals from the transducer 28 are applied to a microprocessor 30 which translates these signals into values indicative of the amount of tension exerted on the input rod 13. An output of the microprocessor 30 is applied to a display driver 32 which causes a display 34, for example a liquid crystal display, to exhibit the tension (switchably expressed in, for example, pounds or grams) exerted on the input rod 13.

Alternatively, the display 34 may be replaced by an array of LEDs or the driver 32 and the display 34 may be replaced by a driver and a series of LEDs which are dedicated to a specific tension value and display a go/-no-go situation.

Numerous alterations of the structure herein disclosed will suggest themselves to those skilled in the art. However, it is to be understood that the above embodiments are for purposes of illustration only and not to be construed as a limitation of the invention. All such modifications which do not depart from the spirit of the invention are intended to be included within the scope of the appended claims.

What is claimed is:

1. A device for checking the calibration of tennis racket stringing machines, comprising an input rod having means for attaching to a tension head of a stringing machine, a force lever system attached to the input rod for receiving the tension exerted on the input rod, a strain transducer attached to the force lever system for converting stresses in the lever system to electrical signals, and a microprocessor system for receiving an output of the transducer and converting the same to an identifiable tension value.

2. A device as claimed in claim 1, wherein said microprocessor system comprises a microprocessor, a driver circuit and a digital display.

3. A device as claimed in claim 2, wherein said digital display is a liquid crystal display.

4. A device as claimed in claim 2, wherein said digital display is an LED display.

5. A device as claimed in claim 1, wherein said microprocessor system comprises a microprocessor, a driver circuit and a series of light emitting elements, wherein said driver circuit is dedicated to a predetermined range of tension values and said series of light emitting elements indicates whether or not the tension exerted on said input rod is within said range of tension values.

6. A device as claimed in claim 1, wherein said input rod is attached to the tension head by a non-stretch cable.

* * * * *